United States Patent
Miyabe et al.

(10) Patent No.: US 10,012,179 B2
(45) Date of Patent: Jul. 3, 2018

(54) EVAPORATED FUEL TREATMENT DEVICES

(71) Applicant: AISAN KOGYO KABUSHIKI KAISHA, Obu-shi, Aichi-ken (JP)

(72) Inventors: Yoshikazu Miyabe, Obu (JP); Minoru Akita, Ama (JP); Naoyuki Tagawa, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 24 days.

(21) Appl. No.: 15/305,209

(22) PCT Filed: Apr. 14, 2015

(86) PCT No.: PCT/JP2015/061427
§ 371 (c)(1),
(2) Date: Oct. 19, 2016

(87) PCT Pub. No.: WO2015/170544
PCT Pub. Date: Nov. 12, 2015

(65) Prior Publication Data
US 2017/0159616 A1 Jun. 8, 2017

(30) Foreign Application Priority Data
May 7, 2014 (JP) ................................. 2014-095751

(51) Int. Cl.
*F02M 25/00* (2006.01)
*F02M 25/08* (2006.01)
*F02D 41/00* (2006.01)

(52) U.S. Cl.
CPC ..... *F02M 25/0827* (2013.01); *F02D 41/0045* (2013.01); *F02M 25/0809* (2013.01);
(Continued)

(58) Field of Classification Search
CPC .......... F02M 25/0827; F02M 25/0836; F02M 25/0854; F02M 25/0809; F02D 41/0042; F02D 41/0045
(Continued)

(56) References Cited

U.S. PATENT DOCUMENTS 5,269,277 A 12/1993 Kuroda et al.
5,373,823 A 12/1994 Kuroda et al.
(Continued)

FOREIGN PATENT DOCUMENTS

CN 102023088 A 4/2011
DE 102010031216 A1 3/2011
(Continued)

OTHER PUBLICATIONS

Japanese Office Action dated Jul. 28, 2017, for Japanese Application No. 2014-095751 (4 p.).
(Continued)

*Primary Examiner* — Thomas Moulis
(74) *Attorney, Agent, or Firm* — Conley Rose, P.C.

(57) ABSTRACT

An evaporated fuel treatment device includes a canister, an evaporated fuel outflow detecting means, a pressure sensor, a pressure change detecting means, and a pressure sensor failure determining means. The canister adsorbs evaporated fuel from a fuel tank, and purges the adsorbed fuel to an engine. The evaporated fuel outflow detecting means undergoes a change in a signal as the evaporated fuel flows out of the fuel tank. The pressure sensor detects an inner pressure of the fuel tank. The pressure change detecting means detects whether or not the pressure is in a static state. When the evaporated fuel outflow detecting means detects that evaporated fuel has flowed out of the fuel tank and when the pressure change detecting means detects that the pressure is
(Continued)

in a static state, the pressure sensor failure determining means determines that the pressure sensor is out of order.

10 Claims, 9 Drawing Sheets

(52) U.S. Cl.
CPC .... *F02M 25/0836* (2013.01); *F02M 25/0854* (2013.01); *F02D 2200/0602* (2013.01); *F02D 2200/0606* (2013.01)

(58) Field of Classification Search
USPC ........................................................ 123/520
See application file for complete search history.

(56) References Cited

U.S. PATENT DOCUMENTS

| | | | |
|---|---|---|---|
| 5,918,581 | A | 7/1999 | Uto et al. |
| 6,371,089 | B1 | 4/2002 | Matsuoka et al. |
| 9,751,396 | B2* | 9/2017 | Dudar ............... B60K 15/03504 |
| 9,802,478 | B2* | 10/2017 | Yang ..................... B60K 15/035 |
| 2011/0067487 | A1 | 3/2011 | Haag et al. |
| 2015/0226138 | A1* | 8/2015 | Yang ..................... B60K 15/035 701/22 |
| 2016/0243931 | A1* | 8/2016 | Dudar ................... F02D 41/003 |

FOREIGN PATENT DOCUMENTS

| | | |
|---|---|---|
| JP | H5-195895 A | 8/1993 |
| JP | H8-74678 A | 3/1996 |
| JP | H9-264205 A | 10/1997 |
| JP | 10-299586 A | 11/1998 |
| JP | 2001-193583 A | 7/2001 |
| JP | 2011-132903 A | 7/2011 |
| JP | 2011-214444 A | 10/2011 |
| JP | 2015-121114 A | 7/2015 |

OTHER PUBLICATIONS

English Translation of Japanese Office Action dated Jul. 28, 2017, for Japanese Application No. 2014-095751 (4 p.).
International Patent Application No. PCT/JP2015/061427 International Search Report dated Jul. 21, 2015 (5 pages).

* cited by examiner

EVAPORATED FUEL TREATMENT DEVICES

CROSS-REFERENCE TO RELATED APPLICATIONS

The present application is a National Phase entry of, and claims priority to, PCT Application No. PCT/JP2015/061427, filed Apr. 14, 2015, which claims priority to Japanese Patent Application No. 2014-095751, filed May 7, 2014, both of which are incorporated herein by reference in their entireties for all purposes.

STATEMENT REGARDING FEDERALLY SPONSORED RESEARCH OR DEVELOPMENT

Not applicable.

BACKGROUND

The present invention relates to an evaporated fuel treatment device. The evaporated fuel treatment device is provided in a system for supplying fuel from a fuel tank to an engine, and functions to detect failure, for example, of a pressure sensor that detects an inner pressure of the fuel tank.

Japanese Laid-Open Patent Publication H08-74678 discloses an evaporated fuel treatment device that causes evaporated fuel in a fuel tank to be sucked in by an engine. The evaporated fuel treatment device includes a device for detecting a failure of a pressure sensor that detects an inner pressure of the fuel tank. The failure detecting device has a switching valve for switching between a state in which the pressure sensor is connected to the fuel tank and a state in which atmospheric pressure is supplied to the pressure sensor. When the detection value of the pressure sensor is beyond a predetermined range including the atmospheric pressure, the failure detecting device is switched from the state in which it is connected to the fuel tank to the state in which the atmospheric pressure is supplied thereto. At this time, when the pressure sensor does not detect the atmospheric pressure, it is determined that the pressure sensor is out of order. Thus, the conventional evaporated fuel treatment device, which requires a switching valve, is of a relatively complicated structure.

BRIEF SUMMARY

Thus, there is a need for an evaporated fuel treatment device which detects failure of the pressure sensor of the fuel tank and which is of a relatively simple construction, and does not require a switching valve.

According to an aspect of the present invention, an evaporated fuel treatment device includes a canister, an evaporated fuel outflow detecting means, a pressure sensor, a pressure change detecting means, and a pressure sensor failure determining means. The canister adsorbs evaporated fuel from a fuel tank, and purges the adsorbed evaporated fuel to an engine. The evaporated fuel outflow detecting means undergoes a change in a signal as the evaporated fuel flows out of the fuel tank. The pressure sensor detects the inner pressure of the fuel tank. The pressure change detecting means detects whether or not the pressure detected by the pressure sensor is in a static state in which the pressure undergoes no change. When the evaporated fuel outflow detecting means detects that evaporated fuel has flowed out of the fuel tank and when the pressure change detecting means detects that the pressure is in a static state, the pressure sensor failure determining means determines that the pressure sensor is out of order.

More specifically, the fuel tank inner pressure detected by the pressure sensor ought to decrease when evaporated fuel has flowed out of the fuel tank. If, in spite of this, the detection pressure detected by the pressure sensor is in a static state in which the detection pressure undergoes no change, the pressure sensor is determined to be out of order. The determination of failure of the pressure sensor is made by using the evaporated fuel outflow detecting means processing a signal that changes due to the outflow of the evaporated fuel, the pressure change detecting means processing the detection signal of the pressure sensor, and the pressure sensor failure determining means processing the signals from the above two detecting means. Thus, the failure of the pressure sensor can be detected solely through signal processing. In this manner, no new member, such as a switching valve for detecting failure of the pressure sensor, is needed. This may prevent the structure of the evaporated fuel treatment device from becoming unnecessarily complex.

The signals that undergo changes in response to the outflow of evaporated fuel from the fuel tank at the evaporated fuel outflow detecting means may be various signals. These signals undergo changes when the evaporated fuel flows out to and is received by the canister or engine. The static state in which the pressure undergoes no change in the pressure change detecting means is, for example, a state in which the degree of variation of the value of the detected pressure detected by the pressure sensor is in a previously set range within a certain period of time. The pressure change detecting means may be configured to detect a static state, or a non-static state.

According to another aspect, the evaporated fuel treatment device includes a passing time detecting means which detects that a predetermined period of time has elapsed after the outflow of evaporated fuel from the fuel tank has been detected by the evaporated fuel outflow detecting means. When the passing time detecting means detects that a predetermined period of time or more has elapsed after the evaporated fuel has flowed out of the fuel tank, and when the pressure change detecting means detects that the pressure is in a static state, the pressure sensor failure determining means determines that the pressure sensor is out of order.

A pressure sensor may be employed in which the upper and lower limits of the detectable pressure are set to be in a range smaller than the actual variation of change of the fuel tank inner pressure. In such cases, the value detected by the pressure sensor may not immediately decrease even if the evaporated fuel has flowed out of the fuel tank and the inner pressure of the fuel tank has been reduced. More specifically, the value detected by the pressure sensor may remain in a static state at the upper limit value for some time due to its upper limit of detectable pressure being smaller than the actual pressure which is being reduced by evaporated fuel flowing out. Thus, during this time, it is impossible to determine whether or not the pressure sensor is out of order. However, even if the actual inner pressure of the fuel tank is at its maximum value, said pressure eventually decreases to less than the detection upper limit value of the pressure sensor, and thus falls within the detectable range, when a predetermined period of time has elapsed after the outflow of the evaporated fuel from the fuel tank. The passing time detecting means detects the lapse of the predetermined period of time or a greater duration. When, at this point such a period of time has lapsed, and the pressure change detecting means detects that the pressure sensor is in the static state in which there is no change in the pressure detected by the pressure sensor, the pressure sensor can then be determined to be out of order. In this way, the failure of the pressure sensor can be detected even when the upper limit of the detectable pressure of the pressure sensor is set to be smaller than the actual possible maximum value of inner pressure within the fuel tank. Thus, the failure of the pressure sensor can be detected even in the case where a so-called full-scale pressure sensor capable of detecting the actual range of variation of temperatures within the pressure tank is not employed.

According to another aspect, the evaporated fuel outflow detecting means comprises a temperature sensor detecting the temperature of the canister, and a control circuit. The control circuit includes an algorithm for detecting that evaporated fuel has flowed out of the fuel tank based on a detection signal from the temperature sensor when the temperature of the canister is not lower than (i.e., greater than or equal to) a predetermined temperature or when the temperature has been increased by a predetermined value or more.

When the evaporated fuel flowing out of the fuel tank is adsorbed by the canister, the temperature of the canister increases. Thus, it is possible to detect that evaporated fuel has flowed out of the fuel tank by detecting the temperature or temperature change of the canister increasing by a predetermined value or more. The temperature of the canister may originally be measured in the evaporated fuel treatment device for some other purpose, where it can be used concomitantly for detecting evaporated fuel flowing out of the fuel tank. For example, an existing temperature sensor may be utilized to detect that evaporated fuel has flowed out of the fuel tank without providing a new sensor.

According to another aspect, the evaporated fuel treatment device includes a closing valve, a purge valve, and an air-fuel ratio control circuit. The closing valve is provided in a vapor path establishing communication between the fuel tank and the canister, and opens and closes the vapor path. The purge valve is provided in a purge path establishing communication between the canister and the engine, and opens and closes the purge path. The air-fuel ratio control circuit includes an algorithm configured to control the air-fuel ratio of an air fuel mixture supplied to the engine by taking into consideration the evaporated fuel supplied from the canister to the engine. The air-fuel ratio control circuit performs control for the case where the evaporated fuel flows out of the fuel tank when the purge concentration of the evaporated fuel in the air fuel mixture supplied to the engine is not less than (i.e., more than or equal to) a predetermined value, with the closing valve and the purge valve being open. The evaporated fuel outflow detecting means has a control circuit including an algorithm for determining whether or not the air-fuel ratio control circuit is performing control for the case where evaporated fuel has flowed out of the fuel tank.

Thus, when the evaporated fuel adsorbed by the canister is purged, an air-fuel ratio control that is taking the evaporated fuel into consideration is performed in the air-fuel control circuit when the purge concentration of the evaporated fuel in the air fuel mixture supplied to the engine is not less than (i.e., greater than or equal to) a predetermined value. It is possible to detect, directly or indirectly, that the purge concentration of the evaporated fuel is not less than (i.e., greater than or equal to) a predetermined value from values such as the purge concentration of the evaporated fuel that is used for the air-fuel ratio control, and the air-fuel ratio control value of the engine. At this time, since the closing valve and the purge valve are in the open state, it is possible to detect that evaporated fuel has flowed out of the fuel tank. Thus, it is possible to detect that evaporated fuel has flowed out of the fuel tank by processing the signal that is used for the air-fuel ratio control of the engine without providing a new sensor.

DETAILED DESCRIPTION

Figure 1:
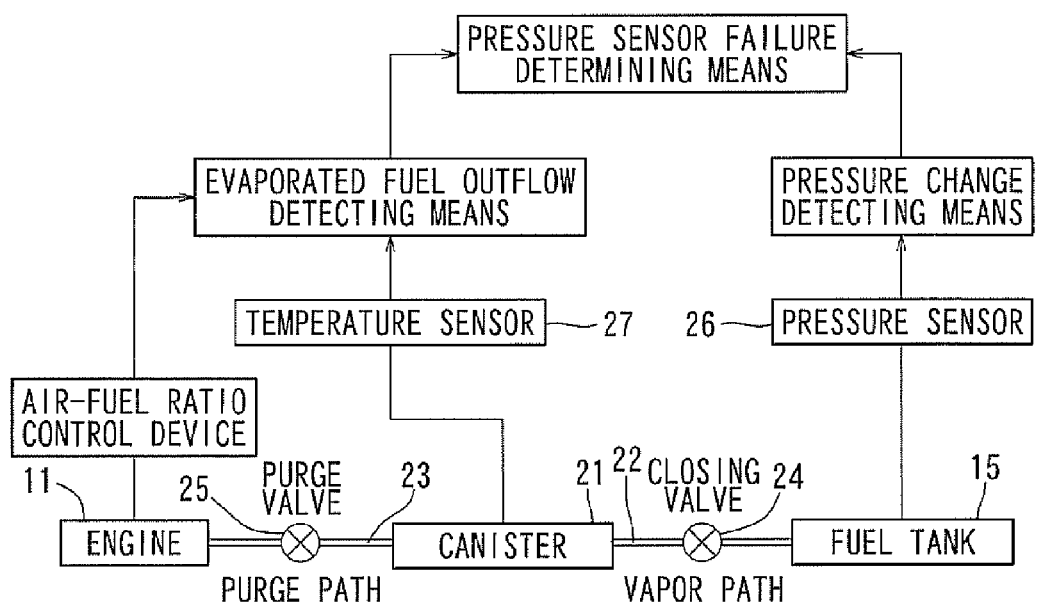
FIG. 1 is a schematic block diagram illustrating an engine system including an evaporated fuel treatment device.
Figure 2:
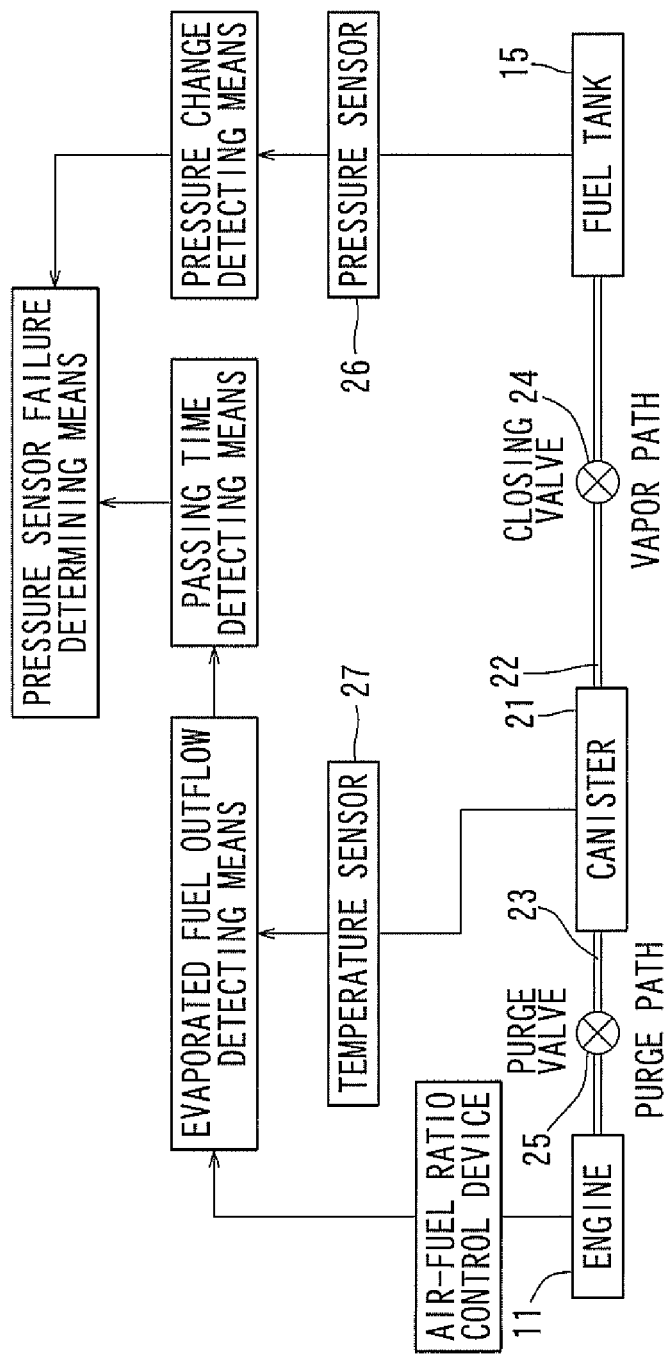
FIG. 2 is a schematic block diagram illustrating the engine system including the evaporated fuel treatment device.
Figure 3:
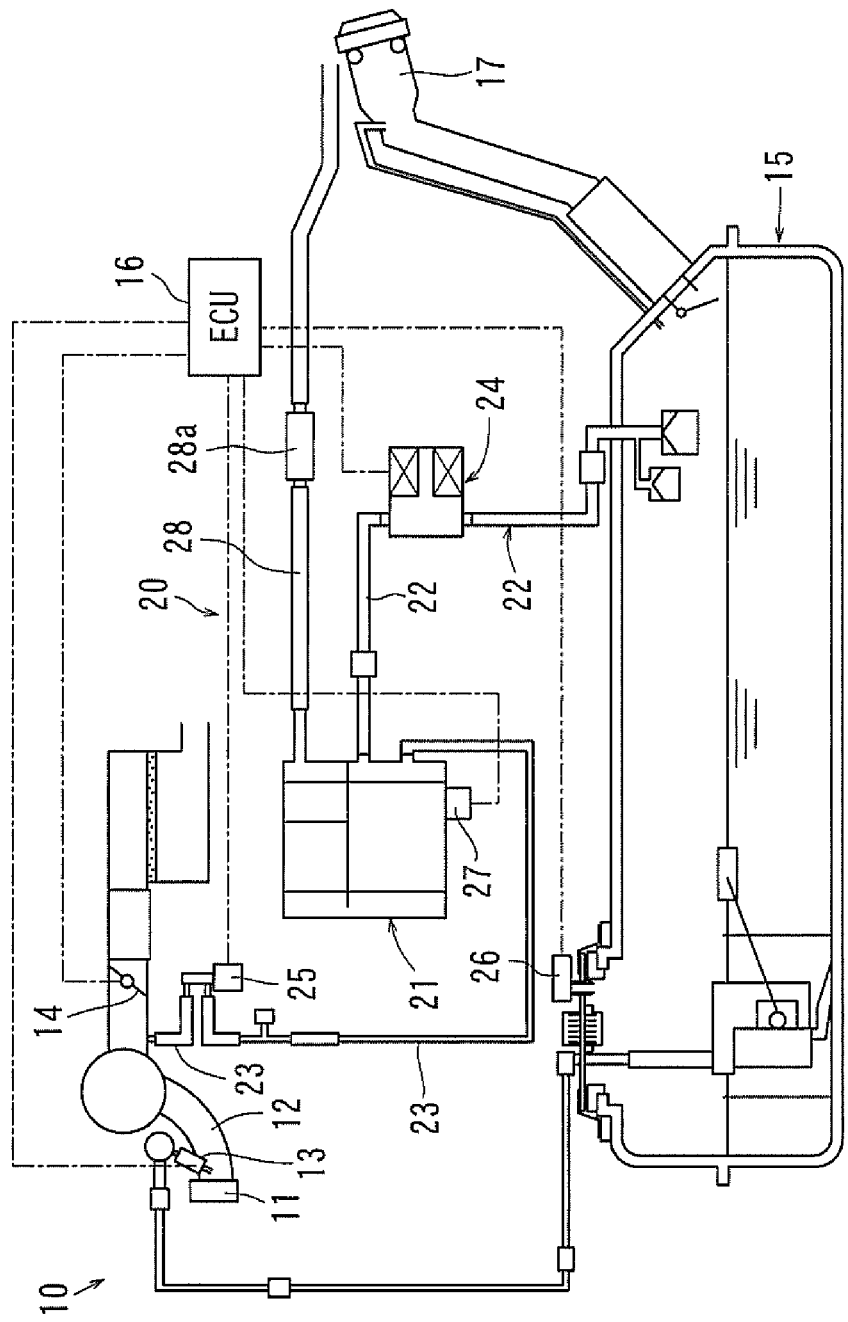
FIG. 3 is a configuration diagram of the engine system.

As shown in FIG. 3, a vehicle engine system 10 according to an embodiment of the present invention has an evaporated fuel treatment device 20. The engine system 10 has, for example, well-known components, and supplies air fuel mixture obtained by mixing fuel with air to an engine main body 11 through an intake path 12. The air is controlled in flow rate by a throttle valve 14, and is supplied to the intake path 12. The fuel is controlled in flow rate by a fuel injection valve 13, and is supplied to the intake path 12.

As shown in FIG. 3, the throttle valve 14 and the fuel injection valve 13 are connected to a control circuit 16. The throttle valve 14 receives a signal from the control circuit 16 and adjusts opening of the intake path 12, supplying a signal corresponding to the opening of said path to the control circuit 16. The fuel injection valve 13 is controlled in opening time by the control circuit 16. Fuel is supplied at a fixed pressure to the fuel injection valve 13 from a fuel tank 15.

As shown in FIG. 3, the evaporated fuel treatment device 20 causes the fuel vapor in the fuel tank 15 to be adsorbed by a canister 21. The evaporated fuel in the fuel tank 15 may be generated when the fuel tank 15 is supplied with fuel, and may be generated from the fuel within the fuel tank 15. The fuel tank 15 and the canister 21 are connected through a vapor path 22. In order to open and close the vapor path 22, the vapor path 22 is provided with a closing valve 24 driven by a step motor. The canister 21 is connected to the intake path 12 downstream of the throttle valve 14 through a purge path 23. The purge path 23 is provided with a purge valve 25 opening and closing the purge path 23.

As shown in FIG. 3, the canister 21 is also connected to an atmosphere path 28. The atmosphere path 28 is open so as to suck in atmospheric air from near a fuel supply port 17 provided with the fuel tank 15. An air filter 28a is provided at some midpoint of the atmosphere path 28. The canister 21 is loaded with activated carbon (not shown) as the adsorbent material. The adsorbent material adsorbs the evaporated fuel flowing in from the vapor path 22. When intake negative pressure is applied to the canister 21 through the purge path 23, atmospheric pressure is supplied to the canister 21 through the atmosphere path 28. Evaporated fuel is released from the adsorbent material due to the atmospheric pressure, and the evaporated fuel is discharged into the intake path 12 through the purge path 23.

As shown by the dashed lines in FIG. 3, various signals necessary for controlling the valve opening time of the fuel injection valve 13 are input to the control circuit 16. In addition to an opening signal of the throttle valve 14, a detection signal of the pressure sensor 26 for detecting the inner pressure of the fuel tank 15 and a detection signal of the temperature sensor 27 detecting the temperature of the canister 21 are input to the control circuit 16. The control circuit 16 controls the opening and closing of the closing valve 24 and the purge valve 25 in addition to the valve opening time of the fuel injection valve 13.

Figure 8:
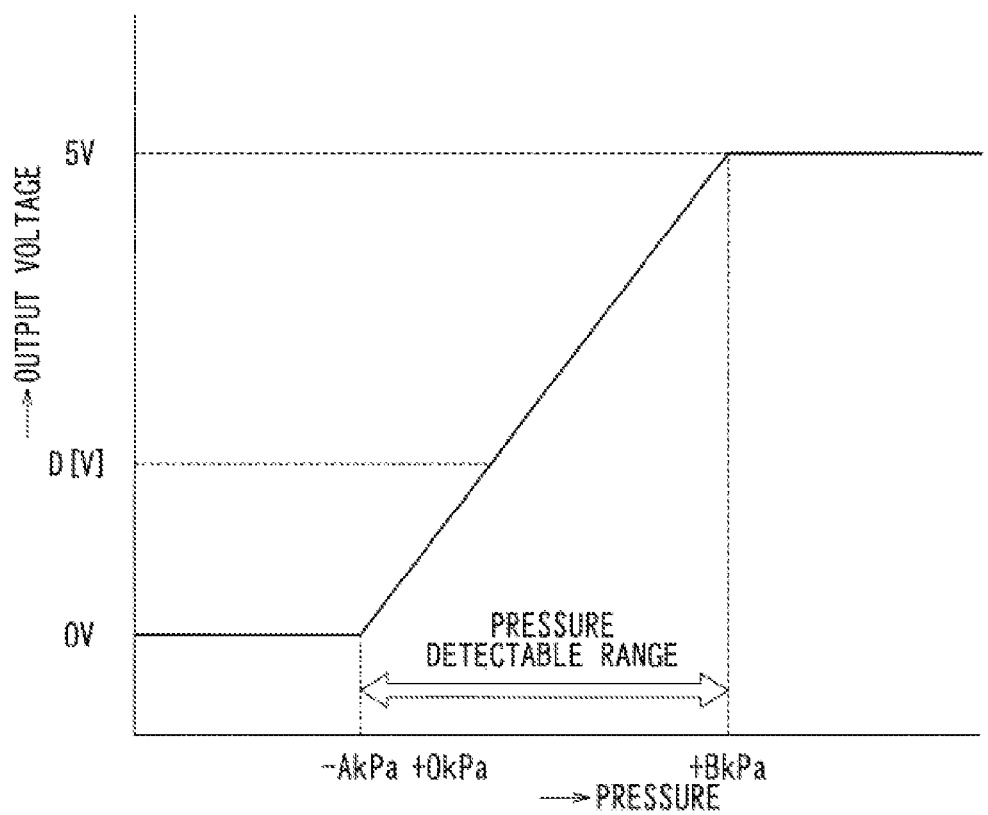
FIG. 8 is a characteristics chart illustrating output of a pressure sensor with respect to pressure.

FIG. 8 illustrates the output characteristics of the pressure sensor 26. In FIG. 8, the horizontal axis indicates the inner pressure of the fuel tank 15, and the vertical axis indicates the output voltage of the pressure sensor 26. In the range where the inner pressure of the fuel tank 15 is lower than −A kPa, the output voltage is zero. Similarly, in the range where the inner pressure of the fuel tank 15 is higher than +B kPa, the output voltage remains at an upper threshold of 5V. Thus, the upper and lower limits of the pressure that can be detected by the pressure sensor 26 are set to be in a range smaller than the upper and lower actual limits of variation of the inner pressure of the fuel tank 15. In detecting a limited range of pressure in this manner, the pressure sensor 26 enhances the resolution of an intermediate range of higher frequency of use, and does not detect a high pressure range and a low pressure range that are of lower frequency of use. As a result, it is possible to employ, as the pressure sensor 26, a sensor that enhances the resolution for higher-use frequencies and is less expensive than a full-scale sensor. In FIG. 8, D V indicates the threshold value for opening and closing the closing valve 24. In the pressure range below D V, the closing valve 24 is closed.

A failure detection routine for the pressure sensor 26 is performed by the control circuit 16 and will be described with reference to the flowchart of FIG. 4. The control circuit 16 has an algorithm for executing the flowchart of FIG. 4. In step S1, the control circuit 16 determines whether a power switch of a vehicle is ON or OFF. When the control circuit 16 determines that the power switch is ON, the procedure advances to step S2. In step S2, the control circuit 16 determines whether or not an output voltage of the pressure sensor 26 is fixed and not less than (i.e., greater than or equal to) D V. When this condition is not satisfied, the closing valve 24 is controlled in a normal fashion in step S12. The normal control of the closing valve 24 is executed in step S13 until the power switch is determined to be OFF.

When, in step S2, the output voltage of the pressure sensor 26 is determined to be fixed and not less than (i.e., greater than or equal to) D V, it is determined in step S3 whether or not purge is being executed. That is, it is determined whether or not the evaporated fuel is being supplied to the engine main body 11 through the purge path 23. When it is determined in step S3 that the purge is not being executed, the closing valve 24 is opened to a predetermined opening degree in step S6. In step S7, it is determined whether or not the temperature of the temperature sensor 27 of the canister 21 has been raised by a predetermined value (e.g., dT) or more. When, in step S6, the closing valve 24 is opened, the evaporated fuel from the fuel tank 15 is adsorbed by the canister 21, and the temperature of activated carbon in the canister increases. Thus, in step S7, when the temperature of the activated carbon is increased by a predetermined value or more, the procedure advances from step S7 to step S8.

As in step S2, in step S8, it is determined whether or not the output voltage of the pressure sensor 26 is fixed and not less than (i.e., greater than or equal to) D V. When it is determined in step S8 that this condition is not satisfied, it is determined in step S11 that the pressure sensor 26 is normal. That is, in steps S6 and S4, the closing valve 24 is opened, and the inner pressure of the fuel tank 15 is reduced. Thus, the detection voltage of the pressure sensor 26 should change accordingly if the pressure sensor is in normal working order. Further, at S2, the output voltage of the pressure sensor 26 is not less than (i.e., greater than or equal to) D V, which is the threshold value for opening the closing valve 24. This means that if this threshold condition is achieved at S2, then the closing valve 24 is subsequently opened and that evaporated fuel is flowing from the fuel tank 15 to the canister 21, reducing the internal pressure of the fuel tank, which should also reduce the measurement of the pressure sensor less than D V if it is in normal working order. Thus, if in step S8, it is determined that the condition of the pressure sensor having a fixed output voltage of not less than (i.e., greater than or equal to) D V is not satisfied (i.e. the measurement voltage is variable and less than D V), it is then consequently determined in step S11 that the pressure sensor 26 is normal. After step S11, the closing valve 24 is controlled in the normal fashion. The normal control of the closing valve 24 is executed until it is determined in step S13 that the power switch is OFF.

In step S6, the closing valve 24 is opened, and the evaporated fuel from the fuel tank 15 is adsorbed by the canister 21. If, subsequently, it is determined in step S8 that the output voltage of the pressure sensor 26 is static, fixed, and not less than (i.e., greater than or equal to) D V, contrary to normal working order of the pressure sensor as described above, then it is determined in step S9 that the pressure sensor 26 is out of order. In the proceeding step (i.e., step S10), the closing valve 24 is closed, and the failure determination processing for the pressure sensor 26 is completed.

When it is determined in step S3 that the purge is being executed, the closing valve 24 is opened to a predetermined opening degree in step S4. In step S5, it is determined whether or not evaporated fuel of a predetermined threshold concentration level or higher in the air fuel mixture is being supplied from the fuel tank 15 to the engine main body 11. This determination is made based on, for example, one of the various signals used for the valve opening control of the fuel injection valve or a combination of a plurality of signals. The signal, for example, is of a minus correction value indicating requirement of an amount reduction correction for the feedback correction of the fuel injection amount by the fuel injection valve 13. Or, the signal is a rich signal indicating that the air-fuel ratio in the exhaust gas of the engine main body 11 is rich. Or, the signal is one for vapor concentration learning. More specifically, it is a signal for performing the fuel injection amount correction based on a vapor concentration learning value and the signal is issued when the control circuit determines that the vapor concentration of evaporated fuel is high from the change in air-fuel ratio due to the vapor purge. Or, it is a signal issued when a canister concentration sensor (not shown) detects evaporated fuel in an amount not less than (i.e., greater than or equal to) a prescribed level. Or, it is a detection signal issued when, as in step S7, the temperature rise in the canister 21 at the temperature sensor 27 is not less than (i.e., greater than or equal to) a predetermined level (dT).

When, in step S5, based on one or a plurality of the aforementioned variety of signals, it is determined that evaporated fuel of a predetermined threshold concentration level or higher in the air fuel mixture is being supplied from the fuel tank 15 to the engine main body 11, the procedure advances to step S8. When it is determined in step S8 that the condition of step S8 is not satisfied, it is determined in step S11 that the pressure sensor 26 is normal. When it is determined in step S8 that the condition is satisfied, it is determined in step S9 that the pressure sensor 26 is out of order.

Figure 4:
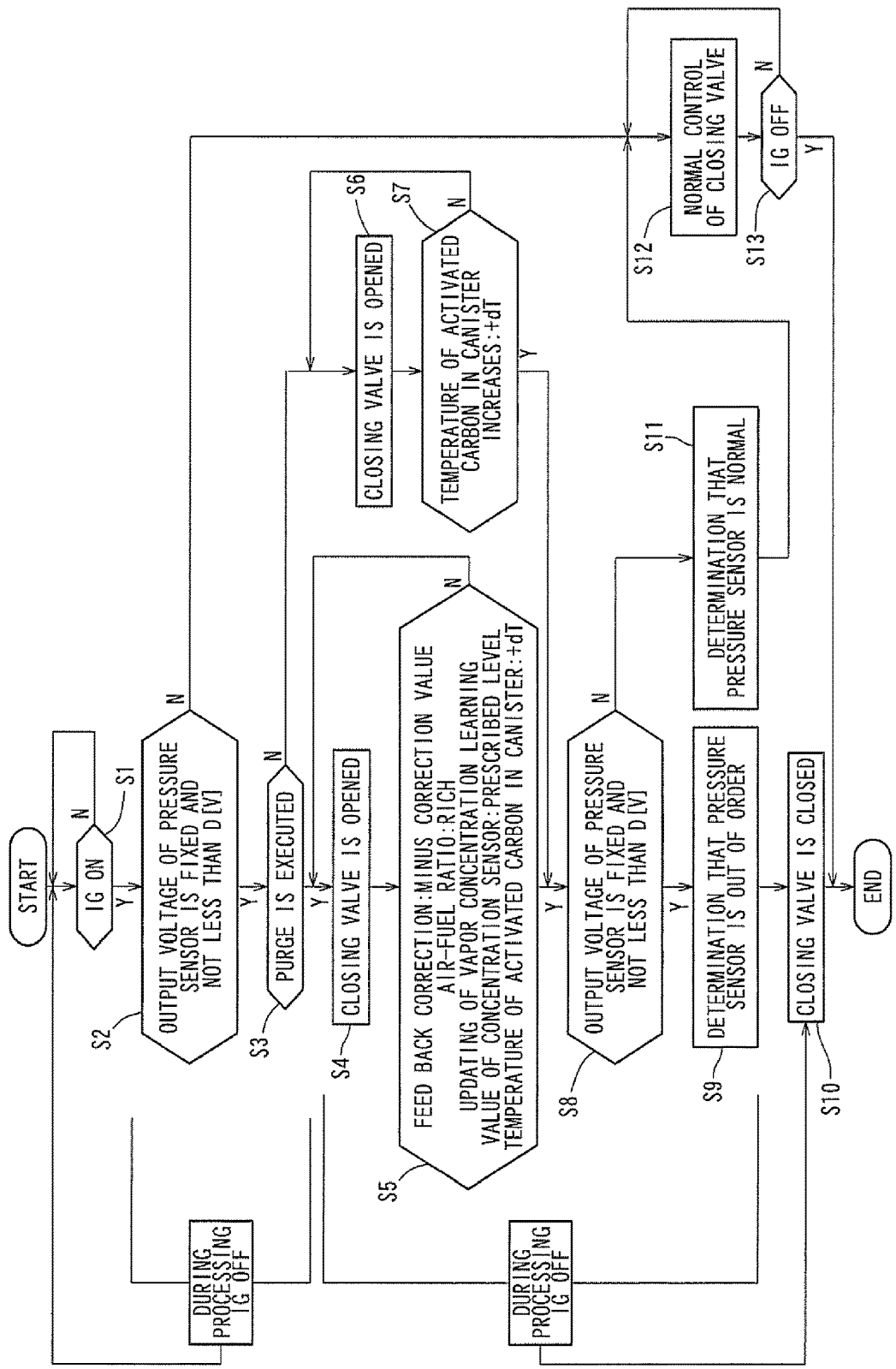
FIG. 4 is a flowchart illustrating a routine for detecting failure of a pressure sensor.

When, as shown in FIG. 4, the power switch is turned OFF during the processing of steps S1 through S3, the procedure returns to step S1, and waits for the power switch to be turned ON again to complete the subsequent steps. When the power switch is turned OFF during the processing of steps S4 through S12, the closing valve 24 is closed in step S10, and the failure determination processing for the pressure sensor 26 is completed.

Figure 5:
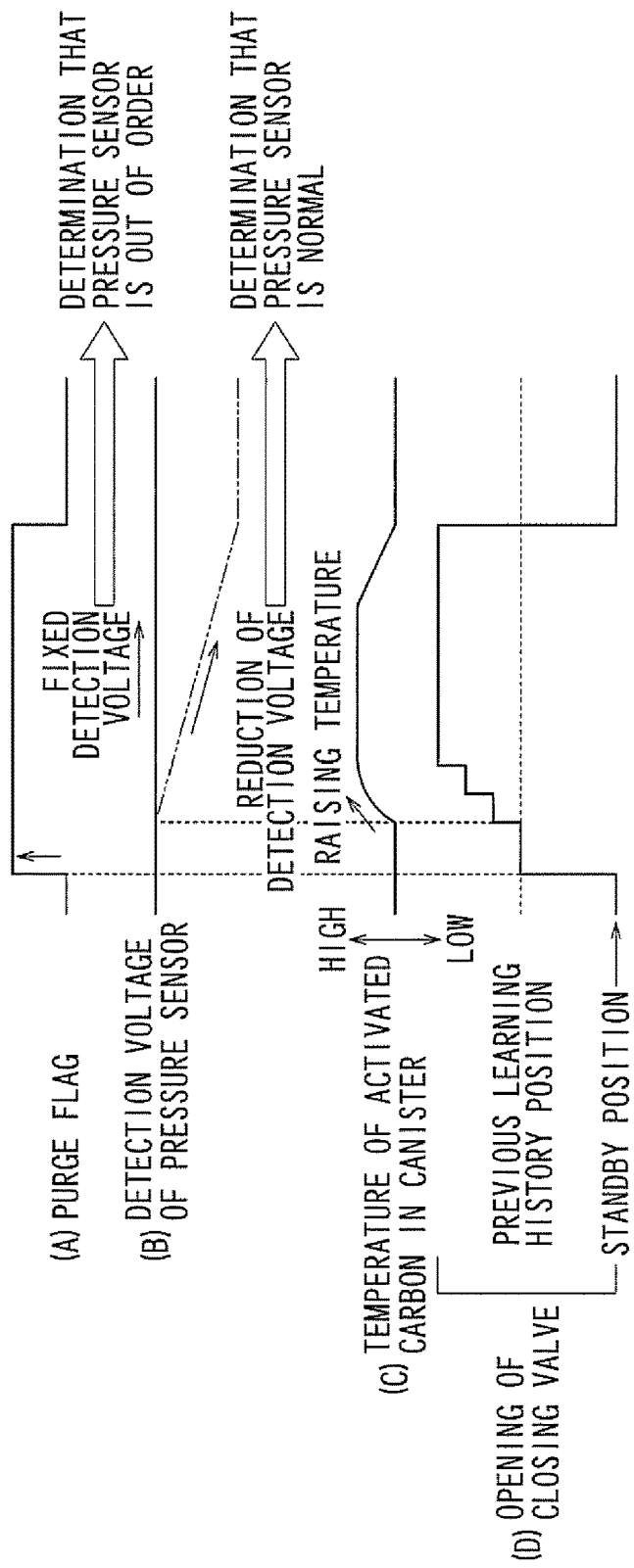
FIG. 5 is a time chart illustrating temperature changes in a canister when evaporated fuel flows out of a fuel tank.

FIG. 5 illustrates how the temperature of the canister 21 is changed in steps S5 and S7 when the closing valve 24 is opened in steps S4 and S6. In portion (A) of FIG. 5, when a purge flag is set, the closing valve 24 is opened. Portion (D) illustrates how the operation of opening the closing valve 24 is conducted. When the purge flag is set, the valve is opened at a stroke from a standby position where the valve is completely closed to a previous learning history position where the valve substantially begins to be opened. After this initial opening, as the closing valve 24 is further opened, the evaporated fuel in the fuel tank 15 flows to the canister 21 through the vapor path 22, and is adsorbed by the canister 21. Thus, when the pressure sensor 26 is normal as indicated by the phantom line of portion (B), the detection voltage is reduced, reflecting reduced pressure of the fuel tank. Further, as shown in portion (C), the temperature sensor 27 of the canister 21 increases. In this way, when the detection voltage of the pressure sensor does not change but is fixed as indicated by the solid line in portion (B) despite the fact that the temperature of the canister 21 has been raised and the pressure of the fuel tank has been reduced, it is determined that the pressure sensor 26 is out of order.

Figure 6:
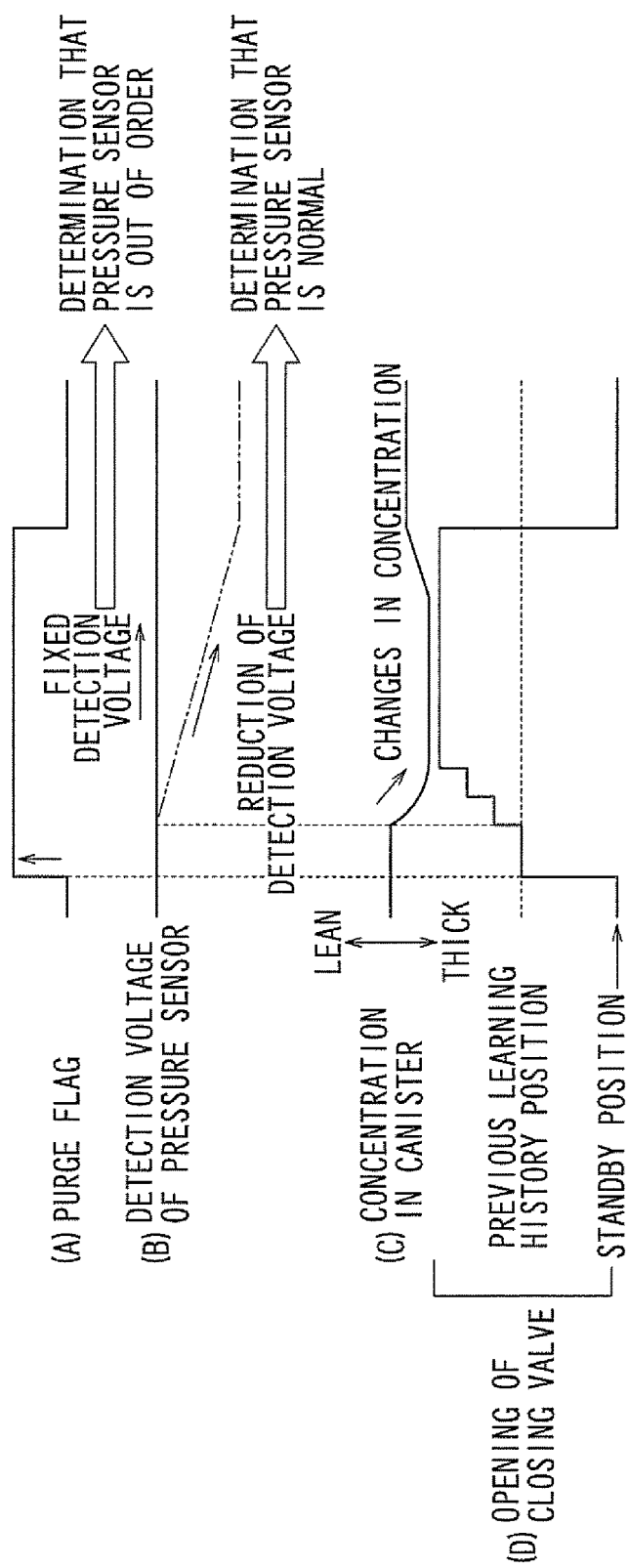
FIG. 6 is a time chart illustrating concentration changes of the evaporated fuel in the canister when evaporated fuel flows of the fuel tank.

FIG. 6 illustrates concentration changes in the canister detected by a canister concentration sensor in step S5. When, as in the case of FIG. 5, the purge flag is set in position as shown in portion (A) of FIG. 6, the closing valve 24 is opened as shown in portion (D). After this initial opening, as the closing valve 24 is further opened, the evaporated fuel in the fuel tank 15 flows to the canister 21 through the vapor path 22, and is adsorbed by the canister 21. Thus, when the pressure sensor 26 is normal as indicated by the phantom line of portion (B), the detection voltage is reduced, reflecting reduced pressure of the fuel tank. Further, as shown in portion (C), the concentration detected by the canister concentration sensor becomes higher (in FIG. 6 'THICK' represents a higher concentration). In this way, when the detection voltage of the pressure sensor 26 does not change but is fixed as indicated by the solid line of portion (B) despite the fact that the concentration detected by the canister concentration sensor has become higher, it is determined that the pressure sensor 26 is out of order.

Figure 7:
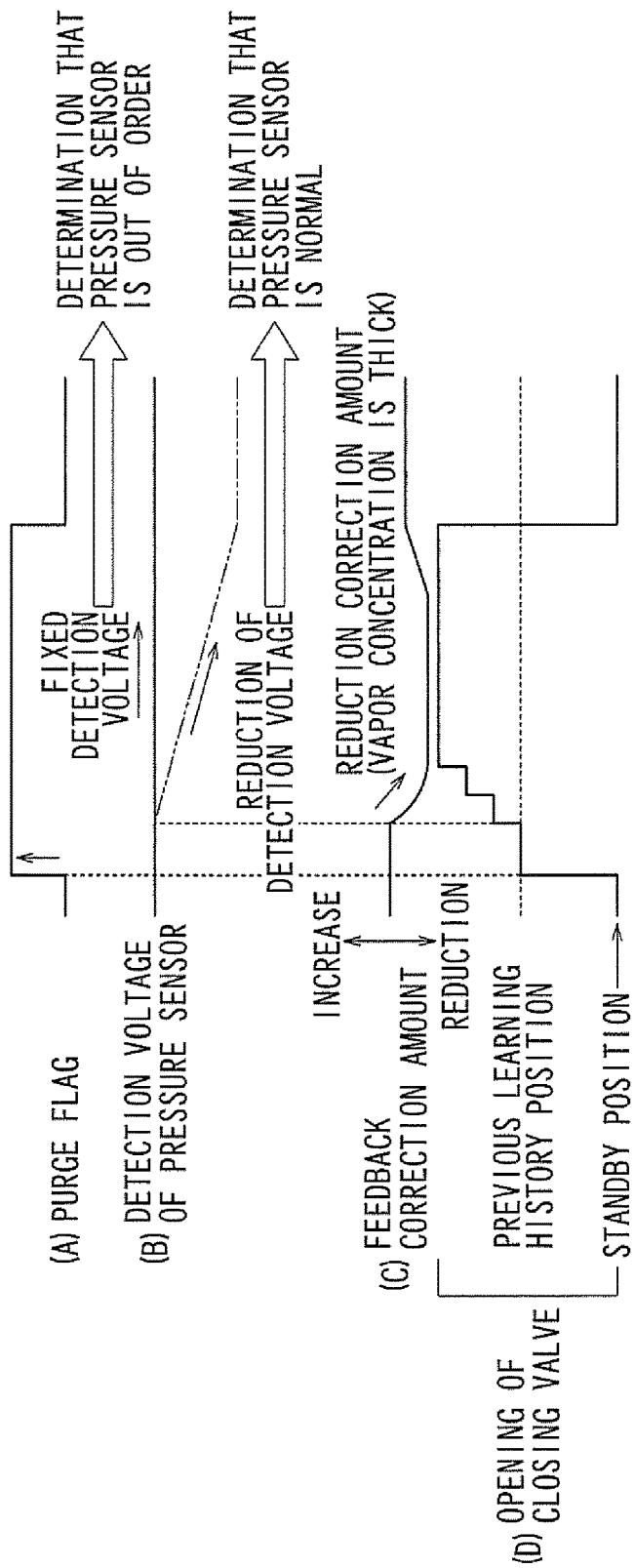
FIG. 7 is a time chart illustrating changes in a fuel injection correction amount for air-fuel ratio control of an engine when evaporated fuel flows out of the fuel tank.

FIG. 7 shows the feedback correction amount of the fuel injection amount at the fuel injection valve 13 in step S5. When, as in the case of FIG. 5, the purge flag is set in position as shown in portion (A) of FIG. 7, the closing valve 24 is opened as shown in portion (D). After this initial opening, as the closing valve 24 is further opened, the evaporated fuel in the fuel tank 15 flows to the canister 21 through the vapor path 22, and is adsorbed by the canister 21. Thus, when the pressure sensor 26 is in the normal state as indicated by the phantom line of portion (B), the detection voltage is reduced, reflecting reduced pressure of the fuel tank. As shown in portion (C), the feedback correction for the fuel injection amount is reduced in accordance with the increase in the evaporated fuel supplied through the purge path 23. When the detection voltage of the pressure sensor 26 does not change but is fixed as indicated by the solid line of portion (B) despite the fact that the feedback correction amount is thus reduced, it is determined that the pressure sensor 26 is out of order.

Figure 10:
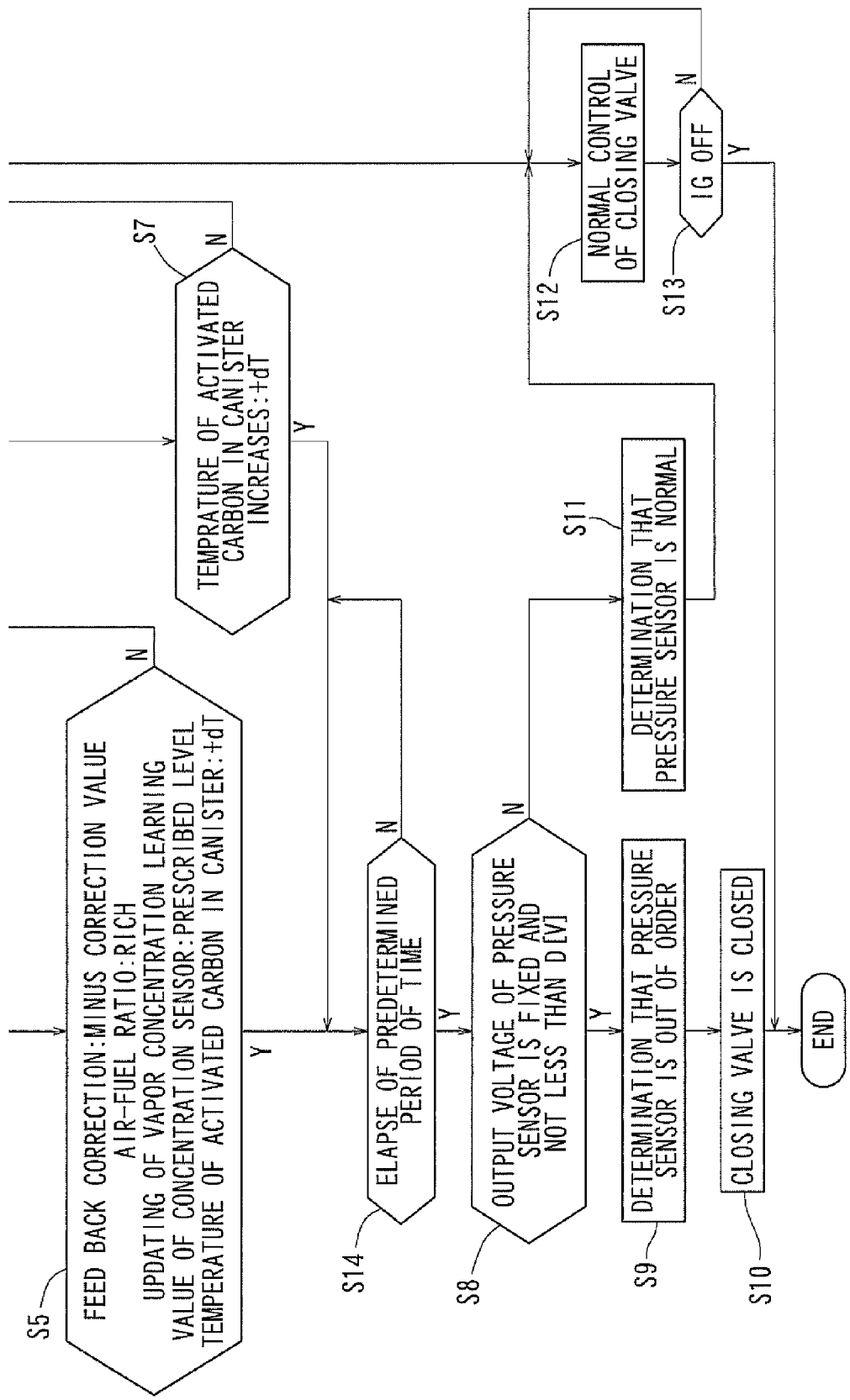
FIG. 10 is a flowchart illustrating a routine for detecting failure in the pressure sensor according to the embodiment of FIG. 9.

Instead of the method of FIG. 4, the method shown in FIG. 10 may alternatively be employed for the failure determination of the pressure sensor 26. The flowchart shown in FIG. 10 is basically the same as the flowchart shown in FIG. 4 except that step S14 is added. Thus, in FIG. 10, the processing on the upstream of step S5 and step S7 is not shown in the figure and is the same as FIG. 4. As shown in FIG. 10, step S14 is added downstream of step S5 and step S7. When it is determined that the condition of step S5 is satisfied, or when it is determined that the condition of step S7 is satisfied, the procedure advances to step S14. In step S14, the processing is kept on standby until a predetermined period of time has elapsed. When the predetermined period of time has elapsed in step S14, the procedure advances to step S8, and the processing from step S8 onward is conducted.

Figure 9:
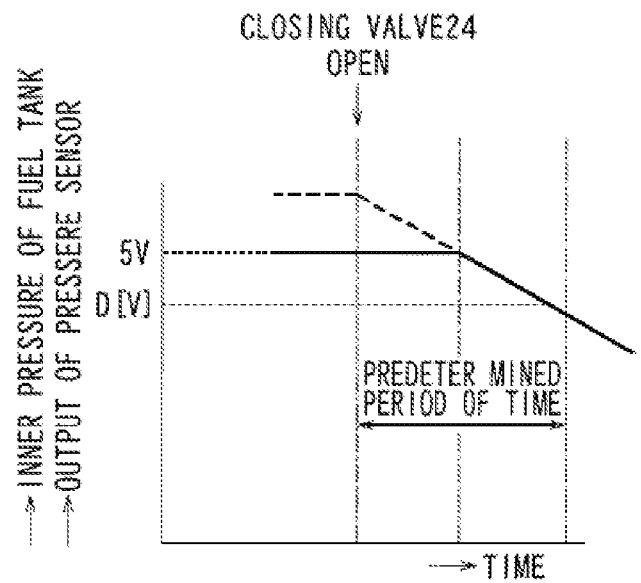
FIG. 9 is a time chart illustrating output changes of a pressure sensor according to another embodiment.

The operation of the embodiment of FIG. 10 will be described with reference to FIGS. 3 and 9. When the closing valve 24 is opened, and the evaporated fuel from the fuel tank 15 is supplied to the engine main body 11 through the canister 21, the inner pressure of the fuel tank 15 is reduced. However, even if the inner pressure of the fuel tank 15 is reduced, the output voltage of the pressure sensor 26 may not be reduced for some time, until the actual pressure variation range coincides with the detectable pressure of the pressure sensor 26 within its upper and lower limit values of detection. As shown in FIG. 9, when initial pressure detection is the upper limit value of 5V, the pressure detection is fixed for some time to 5V before decreasing afterwards, when the actual pressure is reduced to the point where it falls within the detection range of the pressure sensor 26. The broken line of FIG. 9 indicates the change in the inner pressure of the fuel tank 15, and the solid line indicates the output voltage of the pressure sensor 26.

As shown in FIG. 3, when the closing valve 24 is opened, and after a predetermined period of time has elapsed, the inner pressure of the fuel tank 15 becomes a pressure detectable by the pressure sensor 26. In step S14 of FIG. 10, a predetermined period of time is waited to elapse, and then the processing of step S8 is executed. Thus, it is possible to properly determine whether or not the pressure sensor 26 is out of order. When, for example, the output voltage of the pressure sensor 26 at the point in time when the predetermined period of time has elapsed is changed as shown in FIG. 9, it is determined that the condition of step S8 is not satisfied, and it is determined in step S11 that the pressure sensor 26 is in the normal state. On the other hand, when the output voltage of the pressure sensor 26 remains 5V even if said predetermined period of time has elapsed, it is determined the condition of step S8 is satisfied, and it is determined in step S9 that the pressure sensor 26 is out of order.

In the embodiment of FIG. 4 or in the embodiment of FIG. 10, detection of evaporated fuel flowing out of the fuel tank 15 occurs in step S5 or step S7. When it is detected in step S8 that the pressure is in a static state in which the detection pressure of the pressure sensor 26 undergoes no change despite the closing valve being open, it is determined in step S9 that the pressure sensor 26 is out of order. In particular, when evaporated fuel flows out of the fuel tank 15, the inner pressure of the fuel tank 15 detected by the pressure sensor 26 should be reduced. When, in spite of this situation, the pressure is in a static state in which the detection pressure of the pressure sensor 26 undergoes no change, it is determined that the pressure sensor 26 is out of order.

As described above, the failure determination of the pressure sensor 26 includes step S2 and step S8 where a first signal of the pressure sensor 26 is processed, step S5 or step S7 where a second signal changed with the outflow of evaporated fuel is processed, and step S9 where the first signal and the second signal are processed. This means that failure of the pressure sensor 26 can be detected solely through signal processing. Thus, no new member is needed for the failure detection. This may prevent the structure of the evaporated fuel treatment device from becoming overly complex.

According to the embodiment of FIG. 10, it is possible to correctly determine the presence/absence of failure in a pressure sensor 26 in which the upper and lower limits of the detectable pressure is set to a range smaller than the upper and lower actual limits of variation of the inner pressure of the fuel tank 15. In particular, the detection value of the pressure sensor 26 remains at the upper limit value for some time after the closing valve 24 is opened. In this case, even when it is detected that evaporated fuel has flowed out of the fuel tank 15, it is not immediately determined whether or not the pressure sensor 26 is out of order. That is to say, the detection value of the pressure sensor 26 is obtained in step S8 after it is made sure in step S14 that a predetermined time or more has elapsed, such that the pressure falls within detectable limits.

When it is determined in step S8 that the pressure detected by the pressure sensor 26 is in a static state in which the pressure does not change, even after a predetermined period of time has elapsed, it is determined in step S9 that the pressure sensor 26 is out of order. In this way, even when the upper limit value of the detection pressure of the pressure sensor 26 is set to be smaller than the upper actual limits of variation of the inner pressure of the fuel tank, failure of the pressure sensor 26 can be detected. Thus, even in the case where a so-called full-scale pressure sensor, which is expensive, cannot be employed, failure of the pressure sensor 26 can be detected.

The processing of step S2 and step S8 of the embodiment of FIG. 4 and the embodiment of FIG. 10 is executed by utilizing a pressure change detecting means. The pressure change detecting means is any one of various pressure gauges, e.g., a pressure sensor, and, more preferably, an existing pressure sensor. The processing of steps S5 and S7 is executed by utilizing an evaporated fuel outflow detecting means. The evaporated fuel outflow detecting means is any one of various sensors or devices or the like in which a signal undergoes a change when evaporated fuel is purged from the fuel tank 15.

The evaporated fuel outflow detecting means includes, for example, a canister concentration sensor such as a fuel concentration sensor or a temperature sensor contained in the canister in order to measure the evaporated fuel adsorbed by the canister. The evaporated fuel outflow detecting means may also include a control circuit (serving as a control unit) correcting the fuel injection amount according to the purge amount of the evaporated fuel. The correction amount of the fuel injection amount is obtained, for example, by the control circuit based on detection signals from various sensors such as an oxygen sensor for measuring an air-fuel ratio, serving as an air-fuel ratio sensor. Alternatively, the correction amount of the fuel injection amount is obtained based on a vapor concentration learned based on the deviation between the actual air-fuel ratio generated at the time of purging and the target air-fuel ratio.

The processing of step S9 is executed by utilizing a pressure sensor failure determining means. The pressure sensor failure determining means includes, for example, a control circuit 16 which determines failure of the pressure sensor 26 based on the signal from the pressure sensor and on signals from various sensors, devices, etc. the signals of which undergo changes when the evaporated fuel is purged from the fuel tank 15. The processing of step S14 is executed by utilizing a passing time detecting means. The passing time detecting means includes, for example, a timer, and a control circuit measuring passing time based on a signal from the timer.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. Embodiments of the present invention should not be limited to the representative configurations, but may be modified, for example, as described below.

As described above, the pressure sensor 26 may also be a sensor having upper and lower limit values of the detection pressure. Alternatively, the pressure sensor 26 may be a so-called full-scale pressure sensor having no upper and lower limits values in detection pressure.

As described above, the above technique is applicable to a vehicle engine system. The vehicle may be an engine vehicle having solely an engine as the power source, or a hybrid car employing both an engine and a motor.

The invention claimed is:

1. An evaporated fuel treatment device comprising:
a canister configured to adsorb evaporated fuel from a fuel tank and to purge the adsorbed evaporated fuel to an engine;
an evaporated fuel outflow detecting means configured to undergo a change in a signal as the evaporated fuel flows out of the fuel tank;
a pressure sensor that detects an inner pressure of the fuel tank;
a pressure change detecting means that detects whether or not the pressure detected by the pressure sensor is in a static state in which the pressure undergoes no change;
a pressure sensor failure determining means configured to determine that the pressure sensor is out of order when the evaporated fuel outflow detecting means detects that evaporated fuel has flowed out of the fuel tank and when the pressure change detecting means detects that the pressure is in a static state;
a closing valve that is provided in a vapor path establishing communication between the fuel tank and canister, and opens and closes the vapor path;

a purge valve that is provided in a purge path establishing communication between the canister and the engine, and opens and closes the purge path; and an air-fuel ratio control circuit configured according to an algorithm to control air-fuel ratio of an air fuel mixture supplied to the engine based on the evaporated fuel supplied from the canister to the engine, wherein the evaporated fuel outflow detecting means comprises a control circuit configured to determine whether or not the air-fuel ratio control circuit is performing control for the case where evaporated fuel has flowed out of the fuel tank while purge concentration of the evaporated fuel supplied to the engine is not less than a predetermined value, with the closing valve and the purge valve being open.

2. The evaporated fuel treatment device of claim 1, wherein the evaporated fuel outflow detecting means comprises a temperature sensor detecting the temperature of the canister, and a control circuit configured to detect that evaporated fuel has flowed out of the fuel tank based on a detection signal from the temperature sensor when the temperature of the canister is not lower than a predetermined temperature or when the temperature has been increased by a predetermined value or more.

3. The evaporated fuel treatment device of claim 1, wherein the pressure change detecting means includes a control circuit configured to detect whether or not the pressure detected by the pressure sensor is in a static state in which the pressure undergoes no change, and wherein the pressure sensor failure determining means includes an additional control circuit configured to determine whether or not that the pressure sensor is out of order.

4. An evaporated fuel treatment device comprising:

a canister configured to adsorb evaporated fuel from a fuel tank and to purge the adsorbed evaporated fuel to an engine;

an evaporated fuel outflow detecting means configured to undergo a change in a signal as the evaporated fuel flows out of the fuel tank;

a pressure sensor that detects an inner pressure of the fuel tank;

a pressure change detecting means that detects whether or not the pressure detected by the pressure sensor is in a static state in which the pressure undergoes no change;

a pressure sensor failure determining means configured to determine that the pressure sensor is out of order when the evaporated fuel outflow detecting means detects that evaporated fuel has flowed out of the fuel tank and when the pressure change detecting means detects that the pressure is in a static state; and a passing time detecting means configured to detect that a predetermined period of time has elapsed after outflow of evaporated fuel from the fuel tank has been detected by the evaporated fuel outflow detecting means, wherein the pressure sensor failure determining means determines that the pressure sensor is out of order when the passing time detecting means detects that the predetermined period of time or more has elapsed after the evaporated fuel has flowed out of the fuel tank and the pressure change detecting means detects that the pressure is in the static state such that the pressure has not changed.

5. The evaporated fuel treatment device of claim 4, wherein the passing time detecting means comprises a timer, and a control circuit configured to measure that a predetermined period of time has elapsed based on a signal from the timer after the outflow of evaporated fuel from the fuel tank has been detected.

6. An evaporated fuel treatment device comprising:

a canister configured to adsorb evaporated fuel from a fuel tank and to purge the adsorbed evaporated fuel to an engine;

an evaporated fuel outflow detecting means configured to undergo a change in a signal as the evaporated fuel flows out of the fuel tank, wherein said means comprises a first control circuit;

a pressure sensor that detects a tank inner pressure of the fuel tank;

a pressure change detecting means, comprising a pressure gauge, that detects whether or not the tank inner pressure detected by the pressure sensor is in a static state in which the tank inner pressure undergoes no change;

a pressure sensor failure determining means, comprising a second control circuit, configured to determine that the pressure sensor is out of order when the evaporated fuel outflow detecting means detects that evaporated fuel has flowed out of the fuel tank and when the pressure change detecting means detects that the tank inner pressure is in a static state;

a closing valve that is provided in a vapor path that establishes communication between the fuel tank and the canister, wherein the closing valve is configured to open and close the vapor path;

a purge valve that is provided in a purge path that establishes communication between the canister and the engine, wherein the purge valve is configured to open and close the purge path; and a third control circuit comprising an air-fuel ratio control circuit configured according to an algorithm to control air-fuel ratio of an air fuel mixture supplied to the engine based on the measured evaporated fuel by the evaporated fuel outflow detecting means supplied from the canister to the engine;

wherein the first control circuit of the evaporated fuel outflow detecting means is configured to determine whether the air-fuel ratio control circuit is performing control for the case where evaporated fuel has flowed out of the fuel tank while purge concentration of the evaporated fuel supplied to the engine is not less than a predetermined value, and while the closing valve and the purge valve are both open.

7. The evaporated fuel treatment device of claim 6, wherein the evaporated fuel outflow detecting means additionally comprises a temperature sensor configured to detect a temperature, wherein the first control circuit of the evaporated fuel outflow detecting means is configured to detect that evaporated fuel has flowed out of the fuel tank based on a detection signal from the temperature sensor when the temperature crosses a threshold temperature, or when the temperature has been increased by a predetermined value.

8. The evaporated fuel treatment device of claim 6, wherein the pressure change detecting means additionally comprises a third control circuit configured to detect whether or not the tank inner pressure detected by the pressure sensor is in a static state in which the tank inner pressure undergoes no change; and wherein the second control circuit of the pressure sensor failure determining means is configured to determine whether or not that the pressure sensor is out of order based on the signal from the pressure sensor and on the signal from the sensor measuring evaporated fuel adsorbed by the canister.

9. An evaporated fuel treatment device comprising:

a canister configured to adsorb evaporated fuel from a fuel tank and to purge the adsorbed evaporated fuel to an engine;

an evaporated fuel outflow detecting means configured to undergo a change in a signal as the evaporated fuel flows out of the fuel tank, wherein said means comprises a first control circuit;

a pressure sensor that detects a tank inner pressure of the fuel tank;

a pressure change detecting means, comprising a pressure gauge, that detects whether or not the tank inner pressure detected by the pressure sensor is in a static state in which the tank inner pressure undergoes no change;

a pressure sensor failure determining means, comprising a second control circuit, configured to determine that the pressure sensor is out of order when the evaporated fuel outflow detecting means detects that evaporated fuel has flowed out of the fuel tank and when the pressure change detecting means detects that the tank inner pressure is in a static state; and a passing time detecting means configured to detect that a predetermined period of time has elapsed after outflow of evaporated fuel from the fuel tank has been detected by the evaporated fuel outflow detecting means;

wherein the pressure sensor failure determining means determines that the pressure sensor is out of order when the passing time detecting means detects that the predetermined period of time or more has elapsed after the evaporated fuel has flowed out of the fuel tank and the pressure change detecting means detects that at this time the tank inner pressure is in a static state and has not changed.

10. The evaporated fuel treatment device of claim 9, wherein the passing time detecting means comprises a timer and a fourth control circuit configured to measure that a predetermined period of time has elapsed based on a signal from the timer after the outflow of evaporated fuel from the fuel tank has been detected, wherein the pressure sensor used may have a limited-range of detection, smaller than the upper and lower actual limits of variation of the tank inner pressure.

* * * * *